N. W. DALTON.
AEROPLANE.
APPLICATION FILED MAR. 1, 1917.

1,363,847.

Patented Dec. 28, 1920.
6 SHEETS—SHEET 1.

Inventor
NELSON W. DALTON.

By
Attorney

N. W. DALTON.
AEROPLANE.
APPLICATION FILED MAR. 1, 1917.

1,363,847.

Patented Dec. 28, 1920.
6 SHEETS—SHEET 2.

Inventor
NELSON W. DALTON.

By

Attorney

N. W. DALTON.
AEROPLANE.
APPLICATION FILED MAR. 1, 1917.

1,363,847.

Patented Dec. 28, 1920.
6 SHEETS—SHEET 5.

Inventor
NELSON W. DALTON

By
John P. Farbox
Attorney

Inventor
NELSON W. DALTON.

UNITED STATES PATENT OFFICE.

NELSON W. DALTON, OF BUFFALO, NEW YORK, ASSIGNOR TO CURTISS AEROPLANE & MOTOR CORPORATION, A CORPORATION OF NEW YORK.

AEROPLANE.

1,363,847.   Specification of Letters Patent.   Patented Dec. 28, 1920.

Application filed March 1, 1917. Serial No. 151,846.

*To all whom it may concern:*

Be it known that I, NELSON W. DALTON, a citizen of the United States, residing at Buffalo, in the county of Erie and State of New York, have invented certain new and useful Improvements in Aeroplanes, of which the following is a specification.

My invention relates to aircraft and has reference more particularly to military aeroplanes of the scout or reconnaissance type.

A fundamental characteristic of the invention is the arrangement of one or more of the supporting planes above the horizontal plane of the fuselage or body with the wings of the plane next above the fuselage terminating inwardly at points laterally removed from the vertical plane of the fore and aft axis of the craft to provide for a forward and unobstructed observation range from a point aft of said planes. The wing posts, instead of engaging in sockets founded on the wing beams, engage in sockets integrally formed upon a compression member inclosed in and forming a part of the wings.

Another characteristic of the invention is the knock-down construction of the fore part of the fuselage, *i. e.*, that part usually in the immediate vicinity of the power plant of a tractor machine. The struts, longerons, braces, etc., constituting said fore part are preferably constructed of metal tubing, flattened at all intersecting points, with the flattened surfaces or portions detachably secured together to obtain a rigid unified whole. Quick assembly and disassembly are accordingly permitted. Moreover, the landing gear in its entirety is made detachable and when detached is non-collapsible. All tie wires have been eliminated in its construction.

Still another feature of the invention is the empennage construction and arrangement. Instead of terminating the trailing edges of both stabilizing surfaces in the plane of the tail end of the fuselage, said surfaces are disposed in unalined planes and the control surfaces hinged thereto in the usual manner. This done, the king posts or lever arms of the foremost control surface are disposed either entirely or partly within the rearmost stabilizing surface and accordingly removed from the line of air rush incident to flight.

Every consideration is given in the construction of the craft that rapid assembly and disassembly or knock-down may be had without dismantling the various parts considered respectively as a whole. Air resisting surfaces, in so far as practicable, have been entirely removed, and the parts necessarily exposed, streamlined throughout. Speed for reconnoitering duty is in this way enhanced by reason of the ability of the pilot to out-distance and out-maneuver the attacking craft in the event of aerial attack. Furthermore, many structural differences and advantages will be hereinafter pointed out.

Of the drawings, wherein like numerals of reference indicate like or corresponding parts.

The forepart of the fuselage designated in its entirety by the numeral 20 is constructed principally of metal tubing, the upper and lower longerons, designated respectively 21 and 22 of which are constructed, throughout the greater portion of their length, of wood, only the fore part of the said longerons being of metal. Fuselage struts 23 both horizontal and vertical, interconnect the longerons at predetermined stations, the struts aft of the approximate plane of the center of gravity being constructed of wood and the forward struts of metal. These struts together with cross arranged tie wires 24 truss the fuselage from end to end.

Figure 1:
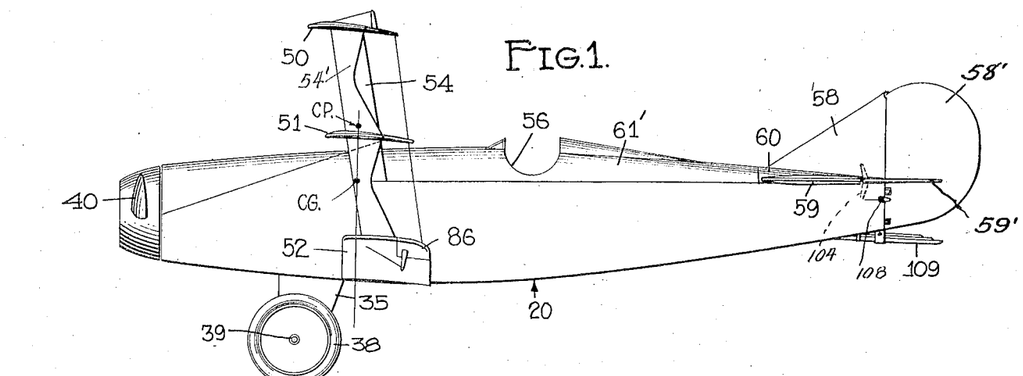
Figure 1 is a side elevation of my improved reconnaissance machine.
Figure 2:
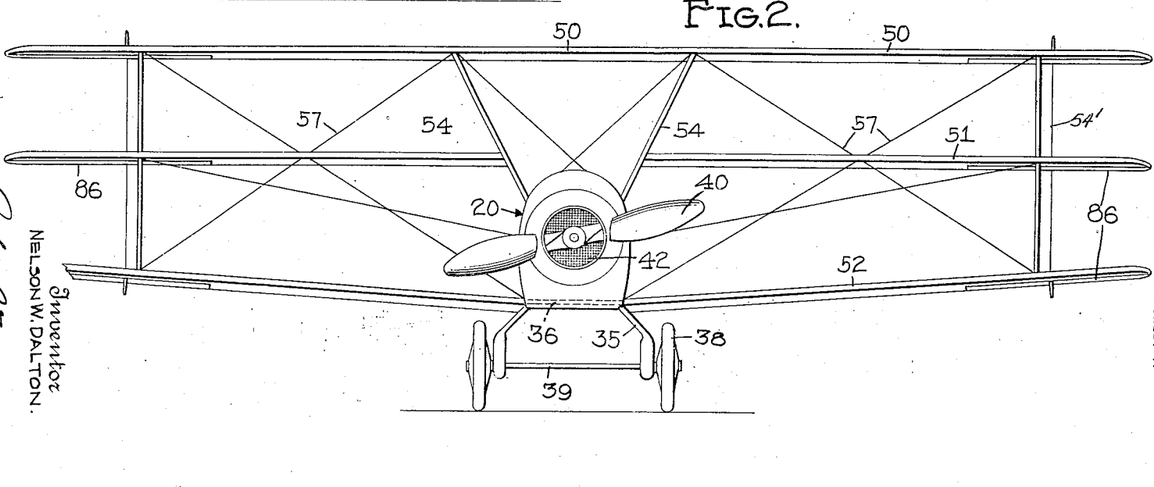
Fig. 2 is a front end elevation.
Figures 3, 4, 14:
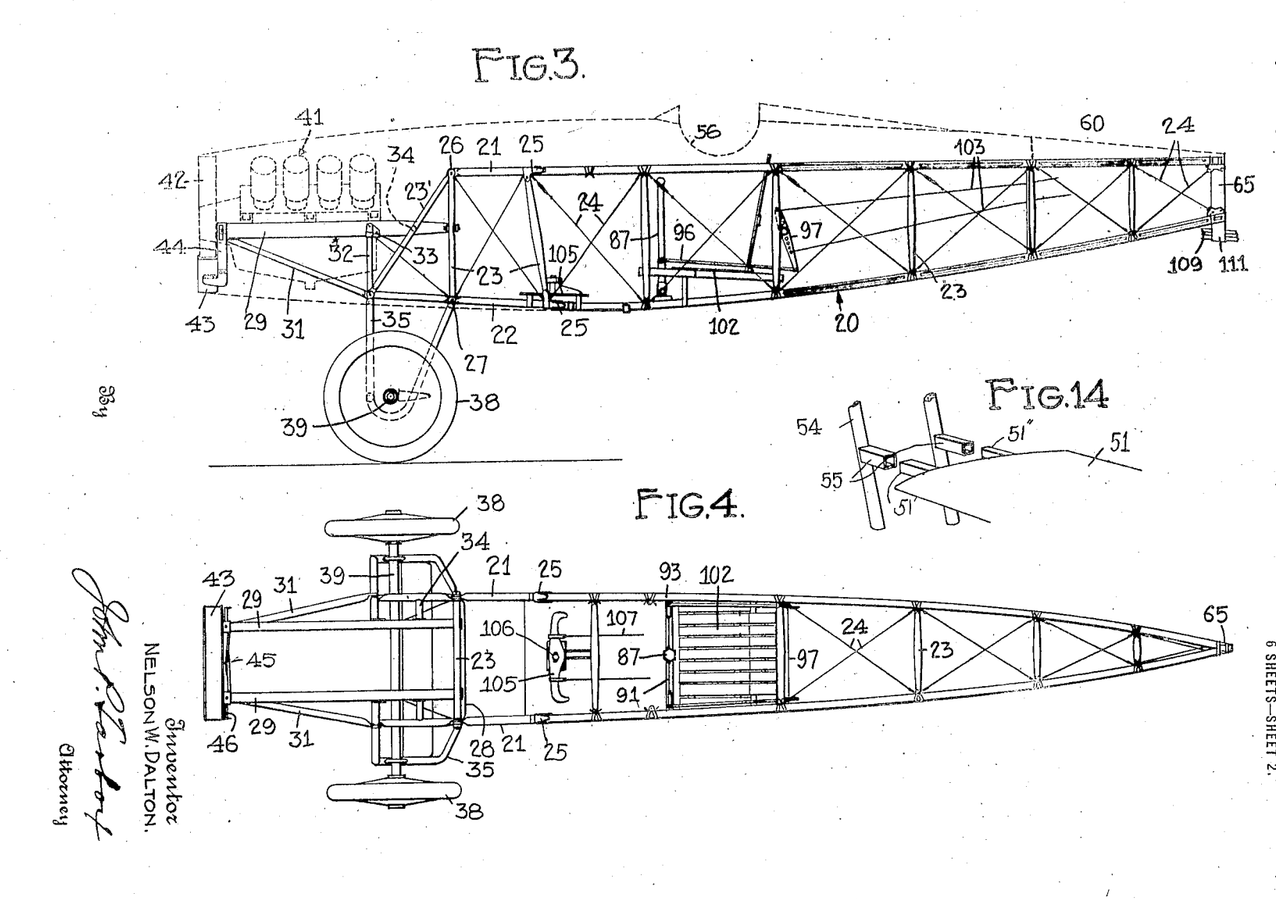
Fig. 3 is a side elevation of the fuselage assembly.
Fig. 4 is a top plan view of the craft as illustrated in Fig. 3.
Fig. 14 is a perspective view of the wing beam sockets of the intermediate plane.
Figures 5, 6, 7:
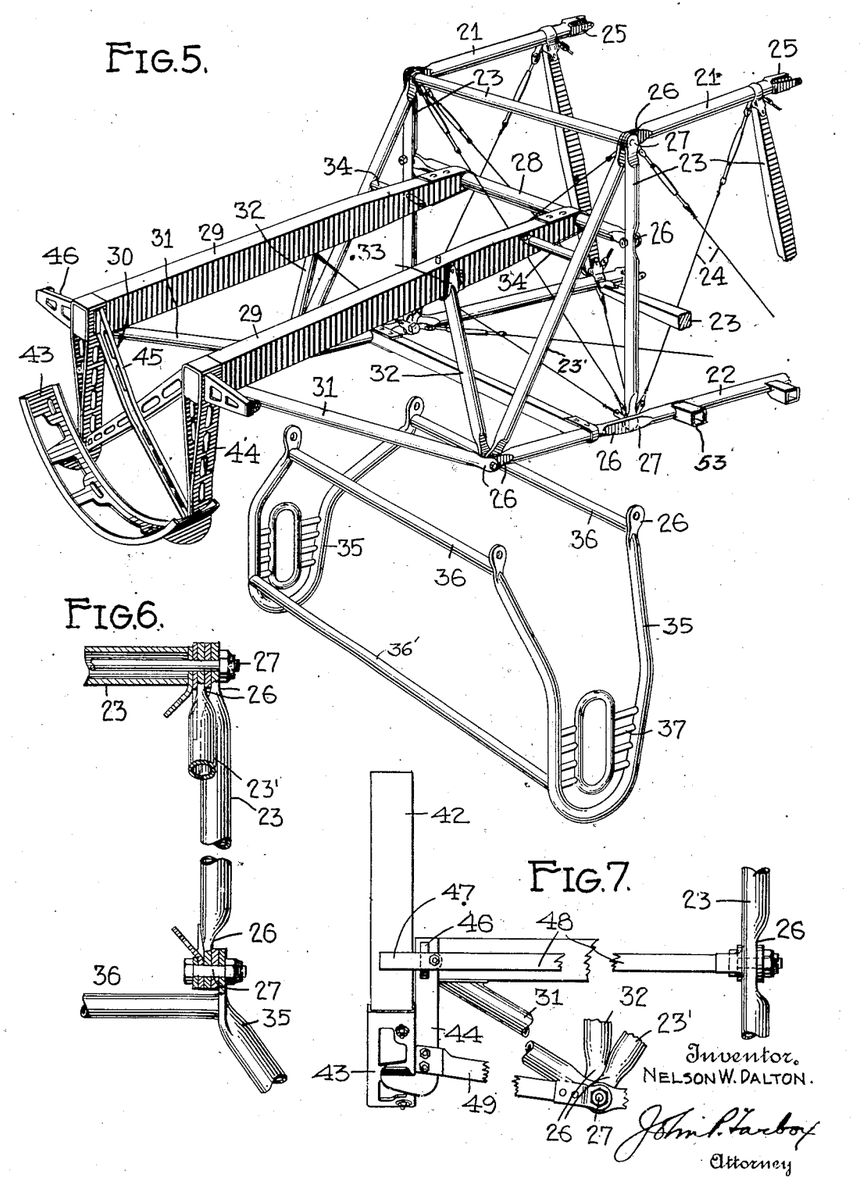
Fig. 5 is a perspective view of the fore part of the fuselage, the landing gear being shown detached.
Fig. 6 is an enlarged fragmentary cross section of the fuselage illustrating the manner in which the metal parts of the fuselage are fastened together.
Fig. 7 is a detail side elevation of the radiator assembly.

The metal portion of each longeron is equipped at its rearward end with a socket 25; each socket receiving the forward extremity of the wooden portion of its associated longeron. Through this arrangement the several longerons may be described as continuous throughout. If desired, the longerons 21 may be lightened at their respective rearward extremities. The metal parts of the fuselage at their points of intersection have been flattened as indicated at 26 for convenience in assembly and extra heavy bolts 27 utilized to fasten the said parts together. Upon reference to Fig. 5 it will be noted that the lower longerons 22 extend forwardly beyond the upper longerons 21. The metal fuselage struts 23 diverge downwardly from the forward extremities of the upper longerons 21 for connection to the lower longerons 22, one of said struts at each side of the fuselage extending substantially vertically and the other diagonally forwardly for attachment to the lower longerons at their respective forward extremities. Said diagonal struts will be hereinafter referred to as the struts 23'. The vertical metal struts 23 are interconnected intermediate their ends by a metal cross strut 28 which in turn affords an anchorage for engine bed beams 29. These beams 29 are disposed in parallelism in a horizontal plane for extension forwardly beyond the forward terminals of the lower longerons 22 to support at their extended terminals an appropriate radiator bracket 30. Metal diagonal braces 31 continue the lower longerons forwardly and diagonally upwardly to the forward extremity of the engine bed, the said braces engaging respectively the beams 29 immediately aft of the radiator bracket. Inwardly converging braces 32 so engage the engine bed beams 29 as to provide therefor what may be termed a principal support or fulcrum. These braces are fastened at one end to the respective lower longerons and at the opposite end equipped with integral beam sockets 33 into which the respective beams 29 are fitted. Aft of the sockets 33, the beams 29 are braced laterally as indicated at 34 to the diagonal struts 23'. All of the parts thus enumerated are constructed of metal, each part being detachable and flattened at its point of intersection with a connected part.

Immediately beneath the metal portion of the fuselage an all metal landing gear is provided. Said landing gear preferably comprises opposed V-type struts 35 arranged to extend laterally and downwardly from the fuselage to widen the wheel base, the legs of the respective V-struts being detachably secured at the foot of the vertical fuselage struts 23 and the diagonal fuselage struts 23' respectively. At their upper extremities, the legs of the V-struts 35 are connected by braces 36 integral with the said struts and removable with the landing gear as a unit and at their lower extremities by a similar cross brace 36'. All cross wiring in connection with the landing gear is thus eliminated and the landing gear so rigidified as to permit of its detachment without collapse. Tier type shock absorbers 37 are mounted at the bight portions of the respective V-struts to cushion the impact of landing. Said devices 37, together with landing gear wheels 38 and a landing gear axle 39 complete the landing gear.

A tractor propellor 40, a motor 41, and a radiator 42 constitute the power plant. The radiator 42 is mounted at the forward extremity of the engine bed, the radiator bracket 30 acting as its support. Said bracket (see Fig. 5) comprises a supporting ledge 43, supporting legs 44, cross braces 45 and arms 46, the latter extending laterally of the forward extremity of the respective beams 29. The legs 44 are of sheet metal lightened and shaped to embrace the beams 29 from which the bracket in its entirety is suspended. The supporting legs 44 depend from the beams 29 and at their lower extremities underlie the supporting ledge 43 which in turn underlies the radiator. The radiating area of the radiator is in this way distributed substantially equally above and below the engine bed. Laterally the radiator is braced as indicated at 47 to the arms 46 and thence rearwardly as indicated at 48 into the fuselage, the rearwardly extending braces 48 approximately paralleling the engine bed beams 29. (See Fig. 7.) The supporting legs 44 are braced rearwardly as at 49 to the forward extremities of the longerons.

It is proposed by the present invention to utilize a triplane wing structure in which the three superposed planes are disposed intermediately across the fuselage in the vicinity of the metal portion thereof. The uppermost and intermediate planes extend across the fuselage in a horizontal plane thereabove, the wings of the uppermost plane meeting in the vertical plane of the fore and aft axis of the craft and the wings of the intermediate plane terminating laterally of the plane of said axis. The supporting planes I have designated respectively 50, 51 and 52, the wing beams (not shown) of the lowermost plane 52 fitting, at their inner extremities, in sockets 53 integrally united to the lower longerons 22. Center wing posts 54 are erected upon the fuselage for upward divergence to support the upper plane 50 intermediate its ends. Sockets 55 are formed upon the said posts 54 to receive the wing beams 51' and 51'' of the intermediate plane 51. Said posts 54 support the wings of said intermediate plane at their inner extremities, the wings terminating squarely in alinement with the posts. The cockpit 56 of the craft is disposed aft of the supporting planes and directly beyond the plane of the intermediate plane 51. Said plane 51, however, offers no obstruction to forward vision, thus giving the pilot a wide observation range directly ahead. Wires 57 interbrace the planes throughout.

The wing posts 54 and 54', the latter interconnecting the planes at or near their outer ends, engage in sockets 55' integrally formed upon compression members 56' which interconnect the beams of the respective wings. (See Fig. 15.) These sockets are formed on said compression members directly adjacent the wing beams and housed by the wing covering which at each socket, or at the extremity of each post, is equipped with detachable surface plates 57'. By removing said plates access may be gained to the sockets. Furthermore, the wing structure may be dismantled with facility should occasion demand.

Figure 8:
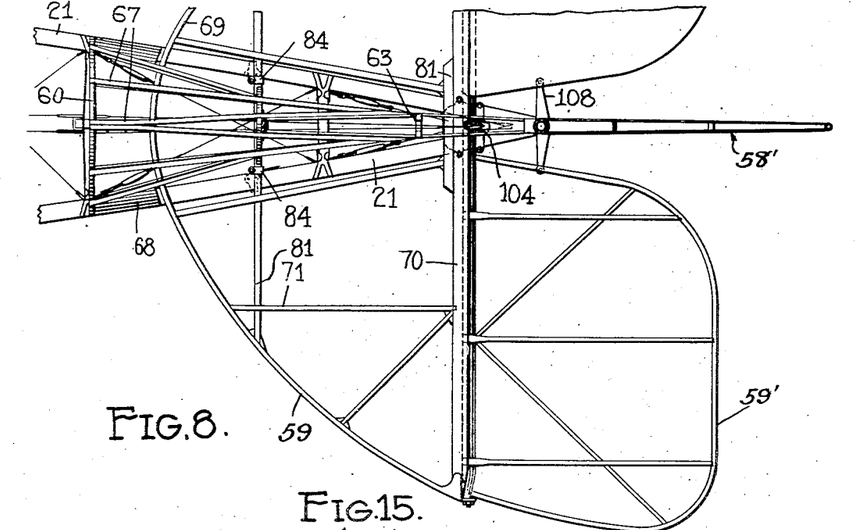
Fig. 8 is a plan view of the empennage stripped of its fabric covering.
Figures 9, 15, 16:
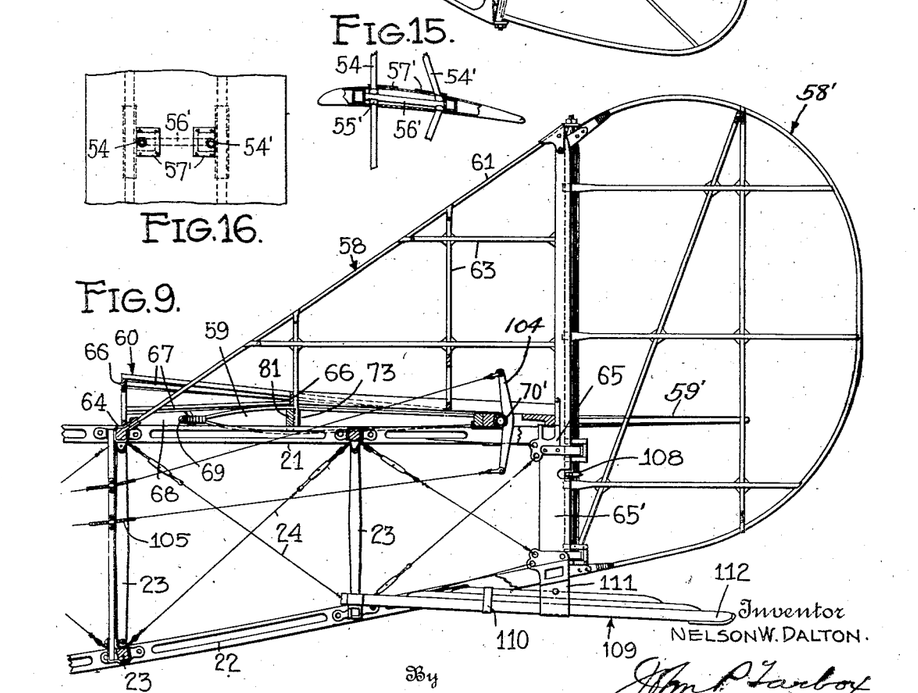
Fig. 9 is a side elevation of the empennage as illustrated in Fig. 8.
Fig. 15 is a cross-section of one of the wings.
Fig. 16 is a fragmentary top plan view of one of said wings.

Upon reference to Figs. 8 and 9 of the drawings, it will be noted that the stabilizing surfaces of the empennage are disposed in unalined planes, the vertical stabilizer, herein designated in its entirely by the numeral 58 extending rearwardly beyond the horizontal stabilizer, designated in its entirety by the numeral 59. The trailing edge of the horizontal stabilizer I have disposed considerably in advance of the tail end of the fuselage and as the control surfaces are hinged respectively to the stabilizing surfaces, the leading edges of the elevators 59' are disposed in advance of the corresponding edge of the rudder 58'. The vertical stabilizer 58 and the tail end section 60 of the fuselage cover 61' are constructed as a unit, that is, built intimately into each other. Said stabilizer comprises a diagonal frame piece 61, a vertical post 62, and interior braces 63, one of said braces (preferably the one located foremost) extending downwardly beyond the perimeter of the stabilizing surface for seating engagement in a socket later to be described. The diagonal frame piece 61 at its forward extremity is fastened to the fuselage by a clip 64 constructed to embrace one of the horizontal fuselage struts 23. In this way the stabilizer 58 is tied down to the fuselage at its forward end. A fitting 65 of special construction is utilized to fasten the stabilizer 58 to the fuselage at its rearward end. This fitting parallels the stabilizer post 62 at its lower end and embraces the longerons 21 at their rearward ends.

The tails section of the fuselage cover continues the cover proper rearwardly beyond the forward extremity of the vertical stabilizer to the rear extremity of the fuselage. An unbroken streamlined surface from the cockpit 56 aft to the stern post, designated 65' is thus provided. Said tail end section comprises transverse forms 66 and longitudinals or runners 67, the latter merging rearwardly as the cross sectional area of the said cover diminishes aft. Abutments 68 are provided at the forward end of the cover section 60 to overhang and engage with the horizontal stabilizer 59. These abutments prevent longitudinal displacement of said stabilizer.

The stabilizer 59, like the stabilizer 58, comprises a frame 69, a horizontal stabilizer post 70, and interior braces 71, one of said braces (preferably the foremost) being notched as indicated at 72 to receive in the notch thus formed the upper longerons of the fuselage. Lateral displacement of the horizontal stabilizer is thus prevented. In assembly, the horizontal stabilizer is anchored to the longerons and the cover section 60 and vertical stabilizer 58 erected thereon, the extended terminal of the foremost interior brace 63 of said vertical stabilizer fitting a socket formed by a socket plate 73 fastened to the cross brace 71 of the horizontal stabilizer. Said stabilizing surfaces are in this way separably united.

Figures 10, 11, 12, 13:
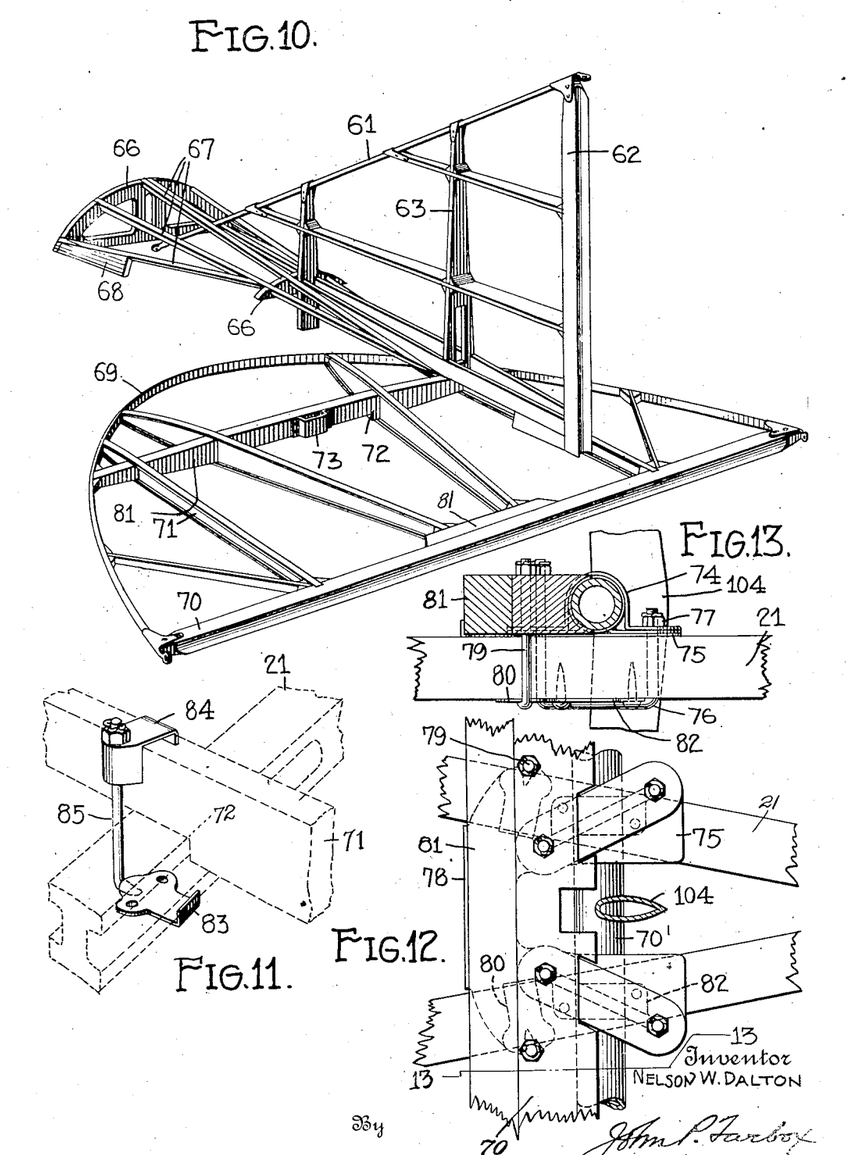
Fig. 10 is a perspective view illustrating the inter-relation of the two stabilizing surfaces and the tail end section of the fuselage cover.
Fig. 11 is a perspective view of one of the clamps utilized for fastening the horizontal stabilizer in place.
Fig. 12 is a plan view of the elevator hinge construction.
Fig. 13 is a section on the line 13—13 of Fig. 12.
Figure 17:
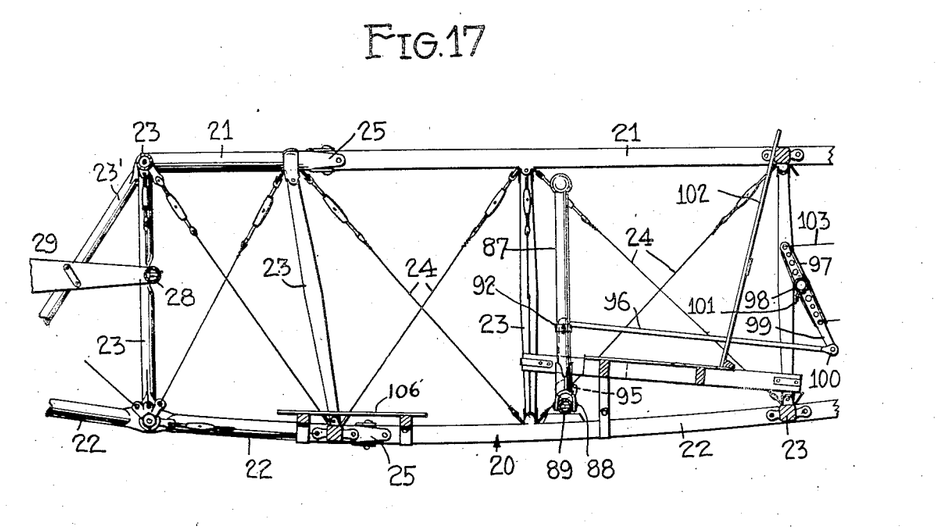
Fig. 17 is a longitudinal section at the mid section of the fuselage illustrating the control mechanism.
Figures 18, 19, 20:
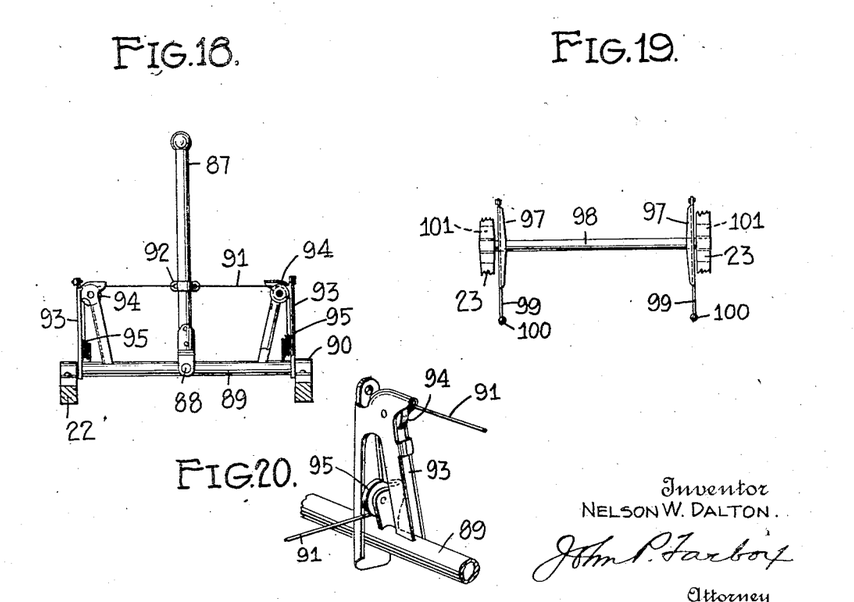
Fig. 18 is an elevation of the control lever and its connections.
Fig. 19 is an elevation of the rocker arm shaft and rocker arms.
Fig. 20 is a perspective view of the aileron guides.

Both control surfaces are of an accepted construction, each arranged with its leading edge in engagement with the stabilizing surfaces 58 and 59. Said control surfaces are hinged for movement in their respective planes, the hinges for the elevators being detailed in Figs. 12 and 13. These hinges consist of a hinge plate 74, a bearing plate 75, and a U-shaped fastening bolt 76, the extensions of the bolt being of unequal length. One of the bolt extensions is arranged to penetrate the hinge plate 74, the bearing plate 75 and the beam 70 of the horizontal stabilizer 59 upon the inside of the upper longerons 21 and the other extension the hinge plate 74 and the bearing plate 75 upon the outside of said longerons. Nuts 77 retain the bolts 76 in place. A fastening means thus constructed possesses exceptional strength and is especially desirable in that the beam 70 of the horizontal stabilizer and the elevator post 70' of the elevators are both fastened to the upper longerons. Added strength is given the fastening of the horizontal stabilizer to the fuselage by the utilization of a flanged plate 78, bolts 79 and clamps 80, the latter underlying the longerons and the plate 78 overlying a filler 81, paralleling beam 70 at an intermediate point. The filler 81, the beam 70 and the longerons 21 are thus joined. Bearing surfaces 82, if desired, may be formed upon the bight portions of the respective U-bolts to increase the bearing surface of said bolts.

A somewhat similar fastening to that just described is used in connection with the horizontal stabilizer at its forward point of connection. (See Fig. 11.) This fastening comprises clamping members 83 and 84 and a connecting bolt 85, the clamping members engaging respectively the longerons 21 and the brace 71 in the vicinity of the notches providing the recess 72.

Control of the ailerons, 86, of which there are six, one at each of the respective wing tips, is obtained through oscillation of a control lever 87 movable in a transverse plane. Said lever 87 is pivoted as at 88 to a shaft 89 arranged to extend across the fuselage, the terminals of the shaft engaging in bearings 90 fastened to the longerons 22. Aileron leads 91 are fastened as at 92 to the lever 87 to extend outwardly from the opposite sides thereof. Standards 93 are made rigid with the shaft 89 adjacent its respective terminals for oscillation with said shaft. Each standard carries sheaves or pulleys 94 and 95 having their respective axes at right angles over which the aileron leads 91 are trained. From the sheaves 95, the said leads 91 extend rearwardly and thence outwardly to the ailerons. Said ailerons are in this way controlled and positively moved through oscillation of the lever 87 in a transverse plane.

Control of the elevators or flaps is also obtained through oscillation of the lever 87. By oscillating the said lever fore and aft, connecting rods 96 are reciprocated and rocker arms 97 of a rocker arm shaft 98 oscillated in a plane parallel with the plane of oscillation of the lever 87. One end of each rocker arm 97 is extended as at 99 for pivotal connection as at 100 to the rear end of the rods 96. The shaft 98 for the rocker arms 97 extends across the fuselage and is journaled in bearings 101 carried by the vertical struts 23 immediately aft of a seat 102 located in the cockpit 56. Leads 103 extend rearwardly from the rocker arms for attachment to the king posts 104 of the elevator flaps. One of the said king posts 104 is extended into the vertical stabilizer 58. (See Fig. 9.) By this arrangement the leads 103 may be so arranged as to avoid exposure at any point to the air rush incident to flight. Guides 105 have been provided interiorly of the fuselage for the leads 103. Fore and aft oscillation of the control lever 87 imparts to the rocker arms 97 a corresponding movement and from the rocker arms the desired motion is transmitted via the leads 103 to the elevator flaps. The location of the leading edge of the elevator flaps in advance of the trailing edge of the vertical stabilizer permits of such an arrangement as has been disclosed. Control of the rudder 58' is obtained through manipulation of a foot bar 105 pivoted as at 106 to flooring 106' of the fuselage at a point in advance of and in convenient proximity to the seat 102. The rudder leads 107 extend rearwardly from the foot bar, interiorly of the fuselage, for connection at their rearward extremities to the king posts 108 of the rudder. By this arrangement only the extreme rearward portions of the rudder leads are exposed. The rudder and elevator flaps are so relatively arranged that the king posts 108 for the rudder do not interfere with the movement of the elevator flaps 59'. Said king posts 108 are low enough (see Fig. 9) to prevent this interference.

Upon reference to Fig. 9 it will be noted that an extremely simple and effective tail skid 109 has been provided. This skid is composed of a plurality of laminated wooden strips, varying in length, and fastened together as indicated at 110. Directly beneath the stern post 65' of the fuselage, a metal fitting 111 is provided, the said fitting embracing the skid 109 to act as a fulcrum therefor. At its forward end, the skid is extended into the fuselage to overlie one of the rear horizontal fuselage struts 23, this strut, for added strength, being constructed of metal tubing. A wearing plate or shoe 112 should be fastened to the skid 109 at its rearward end.

A machine constructed in accordance with the described invention is characterized by a great reduction in the number of flight resistant surfaces, almost perfect streamline of its various exposed parts, and an unobstructed observation range directly ahead, above and below. The tail skid 109 is possessed of a good streamline and is inexpensive. Moreover, if desired, the entire rear portion of the fuselage may be removed from the fore part thereof without dismantling either part.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. In an airplane, a fuselage, a detachable fuselage cover, a horizontal stabilizing surface extended across the fuselage beneath the fuselage cover, and a vertical stabilizing surface built into the fuselage cover for connection with the horizontal stabilizing surface, the vertical stabilizing surface and the fuselage cover being removable as a unit.

2. In an airplane, a fuselage, a removable sectional fuselage cover, a horizontal stabilizing surface mounted at the tail end of the fuselage, the horizontal stabilizing surface for a portion of its length being extended beneath the fuselage cover, and a vertical stabilizing surface likewise mounted at the tail end of the fuselage, the vertical stabilizing surface being removable with one of the fuselage cover sections independently of the horizontal stabilizer.

3. In an airplane, a fuselage, a fuselage cover, and a separately constructed horizontal stabilizing surface extended across the top of the fuselage beneath the fuselage cover.

4. In an airplane, a fuselage, intersecting horizontal and vertical stabilizing surfaces, and a fuselage cover so arranged relatively to the stabilizing surfaces that it (the fuselage cover) embraces the stabilizing surfaces along their line of intersection.

5. In an airplane, a fuselage, a stabilizer, a control surface mounted with its leading edge in advance of the trailing edge of the stabilizer, and a control brace for the control surface inclosed partly within the stabilizer.

6. In an airplane, a fuselage, a horizontal stabilizing surface mounted at the tail end of the fuselage against the top surface thereof, a control surface mounted in direct rearward continuation of the horizontal stabilizing surface, a vertical stabilizing surface erected upon the fuselage likewise at the tail end thereof, the plane of the vertical stabilizing surface and the plane of the horizontal stabilizing surface intersecting, and control horns for the control surface extended respectively into the fuselage and into the vertical stabilizing surface.

7. In an airplane, a fuselage, intersecting stabilizing surfaces mounted at the tail end of the fuselage, a stabilizer brace extended at one end beyond the perimeter of the surface of which it (the brace) forms a part and a socket carried by the intersecting surface to receive the extended brace.

In testimony whereof I hereunto affix my signature.

NELSON W. DALTON.